United States Patent [19]

Monsted, Jr.

[11] 3,850,600
[45] Nov. 26, 1974

[54] FILTER MEDIA
[75] Inventor: John W. Monsted, Jr., Glenshaw, Pa.
[73] Assignee: Mine Safety Appliances Company, Pittsburgh, Pa.
[22] Filed: July 5, 1973
[21] Appl. No.: 376,429

[52] U.S. Cl. .................................. 55/524, 55/528
[51] Int. Cl. ............................................ B01d 39/16
[58] Field of Search ............ 55/524, 522, 527, 528; 210/503–505, 506, 508, 509

[56] References Cited
UNITED STATES PATENTS

| | | | |
|---|---|---|---|
| 2,514,145 | 7/1950 | Stevens | 55/524 |
| 2,573,964 | 11/1951 | Green et al. | 55/524 |
| 2,670,305 | 2/1954 | Wiswesser | 55/524 |
| 3,251,475 | 5/1966 | Till et al. | 55/527 |

Primary Examiner—Bernard Nozick
Attorney, Agent, or Firm—Ronald H. Shakely, Esq.

[57] ABSTRACT

Improved air filters of felt carrying electrically charged resinous particles comprise a felt made from a mixture of wool and acrylic fibers.

4 Claims, No Drawings

FILTER MEDIA

BACKGROUND OF THE INVENTION

It has long been known that wool felt carrying electrically charged resinous particles is an efficient filter for removing finely divided particulate matter from air and such filters have been widely used in respirators. Filters of this type are disclosed by Stevens, U.S. Pat. No. 2,514,145, Green et al., U.S. Pat. No. 2,573,964 and Wiswesser, U.S. Pat. No. 2,670,305. The resinous material may be incorporated by mixing powdered resin with the fibers and then felting the mixture. Or a preformed felt may be impregnated with a solution of the resinous material, dried, and then mechanically worked to break up the resin into small particles. The mechanical working creates an electrical charge in the resin particles that is retained for a long period of time. To the best of my knowledge, only wool felts have been used in making filters of this type, although the patents mention felts containing small amounts of cotton, other plant or animal fibers, or other fibers.

DESCRIPTION OF THE INVENTION

This invention is based on our discovery that felted filter media carrying electrically charged resinous particles in which the felt is a mixture of wool and acrylic fibers has unexpectedly improved efficiency against dust and improved retention of efficiency in the presence of charge degrading conditions, such as exposure to humidity or oil smokes.

Felts are non-woven textiles in which the fibers are interlocked by suitable mechanical work, such as needling. The felts used in this invention are made from a mixture of wool and acrylic fiber, the proportions of which do not appear to be critical so long as there is an effective minimum amount of the minor fiber, suitably a significant proportion of at least about 10 percent by weight. Under present economic conditions it is preferred that the major fiber component be acrylic and the minor fiber component be wool.

Acrylic fibers are manufactured fibers in which the fiber-forming substance is any long chain synthetic polymer compound of at least 85 percent by weight acrylonitrile units,

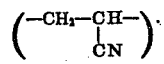

Felts used for respirators are generally light and not too thick, ordinarily weighing about 10–12 oz. per square yard and about 0.080 to 0.110 inches thick. It will be recognized that other felts, including more dense felts, can be used in respirators and other applications, for example, automotive filters, to meet particular needs of filtering efficiency and flow resistance.

The resin may be zinc resinate or any other frangible or brittle resinous material, either natural resins, modified resins, synthetic resins or mixtures thereof. Such resins include, for example, rosin, colophony, copal gum, calcium resinate and polystyrene, as well as other resinous materials disclosed in the earlier mentioned patents. Such frangible or brittle resins will take an electrical charge when mechanically broken into small particles. The proportion of the resin is not critical and filters having from about 2 percent to 50 percent weight resin are practical for use for various purposes; 15 percent - 30 percent resin is now generally preferred for respirators to provide a favorable balance between filtering efficiency and resistance to air flow through the filter.

The following examples are illustrative of this invention.

Example 1. An 11 oz. felt, .010 inches thick, was immersed in a 7.5 percent solution of zinc resinate in trichloroethane solvent and the excess solution was removed by passing the felt through squeeze rolls. The impregnated felt was oven dried and then worked by running it between grooved rollers to give a filter containing about 20 percent by weight of resin. Filters so prepared, using felts containing various proportions of wool (grade 60S to 70S) and acrylic fiber (Orlon 39, 2.5 denier, textile length) were subjected to the DOP test, a standard test for measuring filtering efficiency of oil smokes. DOP, dioctyl phthalate, is vaporized into an air stream forming an oil smoke of highly uniform small particle size, on the order of 0.3 $\mu$, and drawn through the filter to be tested. The percentage of DOP penetrating through the filter is measured, the higher percentage penetration representing poorer filter efficiency. The results set out in Table 1 demonstrate the exceptional increase in filtering efficiency and resistance to degradation of filtering efficiency when using filters with felts of mixed wool and acrylic fibers.

Table I

| Filter Felt | Time Exposed to DOP Smoke | % DOP Smoke Penetration |
| --- | --- | --- |
| 100% Wool | 5 Seconds | 20 |
|  | 5 Minutes | 63 |
| 50% Wool - 50% Acrylic | 5 Seconds | 0.2 |
|  | 25 Minutes | 10 |
|  | 79 Minutes | 82 |
| 30% Wool - 70% Acrylic | 5 Seconds | 0.3 |
|  | 23 Minutes | 10 |
|  | 88 Minutes | 63 |

Example II. Filters made as in the previous example, and exposed to air at 100°F and 80 percent relative humidity for time periods up to 21 days were subjected to the standard silica dust test for measuring filtering efficiency for submicron particles; the higher leakage representing lower efficiency. From the test results set out in Table II it will be observed that a 100 percent acrylic felt filter is much less efficient than a 100 percent wool felt filter and that mixed fiber filters have a filtering efficiency about an order of magnitude greater than those of wool or acrylic fiber. After one day aging in a charge degrading atmosphere the efficiency of the wool felt filter was drastically decreased, making it practically useless as a respirator filter. The mixed-fiber filters, on the other hand, retain a high efficiency even after prolonged exposure to the same atmosphere of at least 21 days and for an indeterminate longer period.

Table II

| Number of Days at 100°F., 80% R.H. | Silica dust test leakage, mg. | | | |
|---|---|---|---|---|
| | 100% wool | 50% acrylic 50% wool | 70% acrylic 30% wool | 100% acrylic |
| Not aged | 1.3 mg. | 0.1 mg. | 0.1 mg. | 2.2 mg. |
| 1 day | 6.7 mg. | 0.1 mg. | 0.1 mg. | — |
| 8 days | — | 0.1 mg. | 0.1 mg. | — |
| 21 days | — | 0.5 mg. | 0.2 mg. | — |

(Maximum allowed according to Bureau of Mines Respirator Test Schedule — 1.5 mg.)

It will be recognized that my invention can be practiced otherwise than as specifically described herein and that the invention is based on my discovery of the unexpected, synergistic effect of using acrylic-wool

I claim:

1. A filter of felted-fibers carrying mechanically electrified resin particles in which the felt consists essentially of wool fibers and acrylic fibers, each fiber being present in an amount at least about 10 percent by weight effective to improve dust collection efficiency and the retention of dust collection efficiency under charge degrading conditions.

2. A filter according to claim 1 having a felt containing a minor proportion of one fiber in an amount of at least about 10 percent by weight.

3. A filter according to claim 1 having a felt containing a major proportion of acrylic fiber.

4. A filter according to claim 1 having zinc resinate particles.

* * * * *

UNITED STATES PATENT OFFICE
CERTIFICATE OF CORRECTION

Patent No. 3,850,600          Dated November 26, 1974

Inventor(s) John W. Monsted, Jr.

It is certified that error appears in the above-identified patent and that said Letters Patent are hereby corrected as shown below:

Column 2, line 13, ".010" should read -- 0.10 --. Column 3, following line 17, insert -- mixed fiber felts in resin carrying felt filters. --

Signed and sealed this 29th day of April 1975.

(SEAL)
Attest:

RUTH C. MASON
Attesting Officer

C. MARSHALL DANN
Commissioner of Patents
and Trademarks